(12) United States Patent
Suzuki et al.

(10) Patent No.: US 8,176,776 B2
(45) Date of Patent: May 15, 2012

(54) PRESSURE SENSOR MOUNTING METHOD, TIRE AND WHEEL HAVING PRESSURE SENSOR, AND TIRE PRESSURE DETECTION DEVICE

(75) Inventors: Hirohisa Suzuki, Ora-gun (JP); Eiji Akama, Ora-gun (JP); Kazuo Hasegawa, Ora-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 944 days.

(21) Appl. No.: 12/223,250

(22) PCT Filed: Jan. 24, 2007

(86) PCT No.: PCT/JP2007/051035
§ 371 (c)(1),
(2), (4) Date: Aug. 14, 2008

(87) PCT Pub. No.: WO2007/086390
PCT Pub. Date: Aug. 2, 2007

(65) Prior Publication Data
US 2010/0147063 A1   Jun. 17, 2010

(30) Foreign Application Priority Data

Jan. 30, 2006  (JP) ................................ 2006-020792

(51) Int. Cl.
*B60C 23/02* (2006.01)
(52) U.S. Cl. .......................... 73/146.5; 73/146; 340/442
(58) Field of Classification Search ........................ None
See application file for complete search history.

(56) References Cited

U.S. PATENT DOCUMENTS

| 4,067,235 A * | 1/1978 | Markland et al. ............ 73/146.5 |
| 5,554,806 A | 9/1996 | Mizuno et al. |
| 6,035,712 A | 3/2000 | Ohta et al. |
| 6,304,232 B1 * | 10/2001 | Brown et al. ................. 343/895 |
| 6,388,636 B1 * | 5/2002 | Brown et al. ................. 343/866 |

(Continued)

FOREIGN PATENT DOCUMENTS

CN        2639038 Y        9/2004
(Continued)

OTHER PUBLICATIONS

Office Action issued in Japanese Application No. 2007-555957 dated Apr. 26, 2011 (with partial translation).

(Continued)

*Primary Examiner* — Lisa Caputa
*Assistant Examiner* — Jermaine Jenkins
(74) *Attorney, Agent, or Firm* — Oliff & Berridge, PLC

(57) ABSTRACT

The accuracy of a measurement value obtained by a tire pressure detection device is lowered by a centrifugal force and an inertial force during travel. A pressure sensor (30) displaces a diaphragm (20) in its vertical direction (32) according to the pressure. The pressure sensor (30) is arranged in a tire (2) with the vertical direction (32) directed to a direction parallel to a rotation axis (34) instead of the tire circumferential direction or radial direction. The pressure sensor (30) is mounted onto a substrate with the vertical direction (32) of its diaphragm (20) directed in parallel to the substrate surface and the substrate is bonded to a tread portion of the tire (2) and a wheel rim portion while adjusting the vertical direction (32) of the diaphragm (20) with the direction of the rotation axis (34).

1 Claim, 4 Drawing Sheets

U.S. PATENT DOCUMENTS

| | | | |
|---|---|---|---|
| 6,536,288 B2 * | 3/2003 | Scholz et al. | 73/718 |
| 6,568,275 B2 * | 5/2003 | Scholz et al. | 73/718 |
| 6,791,457 B2 * | 9/2004 | Shimura | 340/448 |
| 7,010,969 B1 * | 3/2006 | Huang | 73/146 |
| 7,310,069 B2 * | 12/2007 | Nantz et al. | 343/711 |
| 7,343,787 B2 * | 3/2008 | Oflaz | 73/146 |
| 7,478,554 B2 * | 1/2009 | Roth et al. | 73/146 |
| 2004/0155764 A1 | 8/2004 | Ichinose | |

FOREIGN PATENT DOCUMENTS

| | | |
|---|---|---|
| CN | 2663183 Y | 12/2004 |
| JP | U-02-084997 | 7/1990 |
| JP | A-08-320341 | 12/1996 |
| JP | A-10-253652 | 9/1998 |
| JP | A-10-315720 | 12/1998 |
| JP | 2004053329 A * | 2/2004 |
| JP | A-2004-053329 | 2/2004 |
| JP | A-2004-203165 | 7/2004 |
| JP | A-2004-237951 | 8/2004 |
| JP | A-2005-114558 | 4/2005 |

OTHER PUBLICATIONS

Office Action issued in Japanese Application No. 2007-555957 dated Jul. 12, 2011 (with partial translation).

Office Action issued in Korean Patent Application No. 10-2008-7014616, dated Jun. 11, 2010 (with partial English-language translation).

* cited by examiner (a)

(b)

(c)

PRESSURE SENSOR MOUNTING METHOD, TIRE AND WHEEL HAVING PRESSURE SENSOR, AND TIRE PRESSURE DETECTION DEVICE

TECHNICAL FIELD

The present invention relates to a method for mounting a pressure sensor for determining the air pressure of an automobile tire or the like, a tire and a wheel having a pressure sensor mounted thereon, and a tire pressure detection device and, more particularly, to improvement in accuracy of the determined pressure.

BACKGROUND ART

In the United States, a law for enforcing a tire air pressure alert device mounted on an automobile has been put into effect. As a tire pressure monitoring system (TPMS), a system employing RFID (Radio Frequency Identification) technique has been proposed. In the TPMS using RFID technique, a transponder (a tire pressure detection device) having a pressure detection function and mounted on a tire communicates by radio with a reader (a control unit) mounted on a vehicle body, while utilizing the RFID technique.

The value or the like measured by the pressure sensor is digitally encoded by a transponder, and the resultant digital code is sent to a vehicle side reader, using the RFID technique. Having received the digital code, the reader obtains data, such as a measured air pressure value, from the received digital code.

The pressure sensor comprises a displacing portion, such as a diaphragm or the like, subjected to mechanical displacement, and a structure for converting the displacement into a change of electrical resistance and/or electrostatic capacitance, to thereby convert the displacement due to pressure into an electric signal for determination.

DISCLOSURE OF THE INVENTION

Problems to be Solved by the Invention

In the TPMS, a pressure sensor for determining tire air pressure is mounted inside the tire, and monitors the air pressure inside the tire mainly when the tire is rotating, that is, while the vehicle is traveling. With the above, there is a problem that centrifugal force due to the rotating tire and inertial force due to change of the rotation speed act on the displacing portion of the pressure sensor, which deteriorates the accuracy of the pressure measurement.

In view of the above, the present invention aims to solve the above described problem and realize a TPMS for measuring air pressure inside a tire with improved accuracy.

Means for Solving the Problems

According to one aspect of the present invention, there is provided a pressure sensor mounting method for mounting a pressure sensor having a displacing portion to be displaced according to air pressure, inside a tire of a vehicle, wherein a displacing direction of the displacing portion is set parallel to a rotational axis of the tire. According to the present invention, the displacing direction of the displacing portion forms a right angle relative to the direction of the centrifugal force and that of the inertial force.

According to another aspect of the present invention, there is provided a tire having a pressure sensor mounted thereon having a displacing portion to be displaced according to air pressure, wherein a displacing direction of the displacing portion is set parallel to a rotational axis of the tire.

According to another aspect of the present invention, there is provided a wheel having a pressure sensor mounted thereon having a displacing portion to be displaced according to air pressure, wherein a displacing direction of the displacing portion is set parallel to a rotational axis of the wheel.

According to another aspect of the present invention, there is provided a tire pressure detection device, mounted inside a tire of a vehicle, for detecting air pressure inside the tire, comprising a pressure sensor for measuring the air pressure, using a displacing portion to be displaced according to the air pressure; and a circuit board having a response circuit mounted on a board surface thereof, the response circuit for sending, through mutual reaction with a supply electromagnetic field applied from outside, data measured by the pressure sensor to the outside, wherein the pressure sensor is mounted on the circuit board such that a displacing direction of the displacing portion is set parallel to the board surface.

In the above, the circuit board may be attached on a tread portion of the tire or a rim portion of a wheel on which the tire is mounted, such that the displacing direction of the displacing portion is set parallel to the rotational axis of the tire.

Effects of the Invention

With an arrangement such that the displacing portion is displaced in a direction forming a right angle relative to the centrifugal force and inertial force directions, the displacing portion is less likely to be displaced due to the centrifugal force and the inertial force. That is, the pressure sensor is less likely to be affected by the centrifugal force and inertial force, as a result of which the accuracy of pressure measurement can be improved.

BEST MODE FOR CARRYING OUT THE INVENTION

In the following, an embodiment of the present invention (hereinafter referred to as an embodiment) will be described based on the accompanying drawings.

Figure 1:
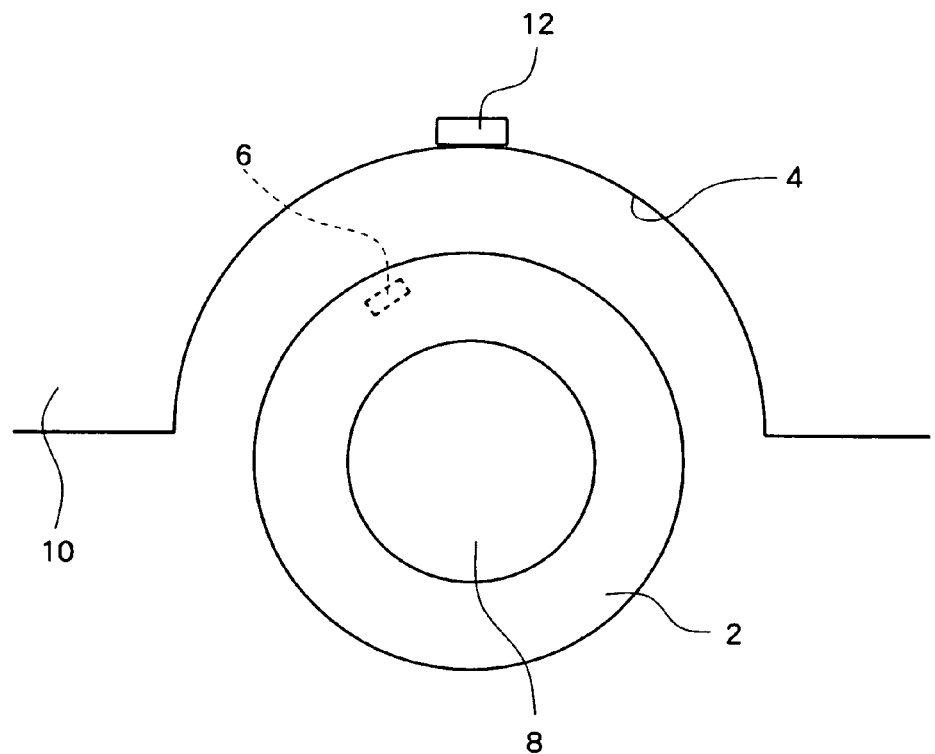
FIG. 1 is a schematic view showing a part of an automobile, related to a tire having a TPMS utilizing RFID mounted thereon, and a wheel housing.

FIG. 1 is a schematic diagram showing a part of an automobile, related to a tire 2 having a TPMS utilizing RFID mounted thereon and a wheel housing 4, viewed from the side of the vehicle. A transponder 6, or a tire pressure detection device, is mounted on the inner surface of the tire 2 mounted on a wheel 8. In FIG. 1, by way of one example, the transponder 6 is attached inside the tread portion (the bottom surface) of the tire. A reader 12 is mounted on a vehicle body 10 in the vicinity of the tire 2, such as on the highest portion of the wheel housing 4.

The transponder 6 is connected wirelessly with the reader 10. That is, the transponder 6 determines air pressure inside the tire on which the transponder 6 is mounted, and sends out data about the determined air pressure, and the reader 10 detects the data from the transponder 6. The data about the detected pressure information is notified to the vehicle control unit, such as, e.g., an ECU or the like, to be used to control traveling of the vehicle and/or to warn the driver according to the tire air pressure.

For example, a circuit which constitutes the transponder 6 may be formed on a flexible board. For example, a coil which acts as an RFID antenna may be formed as a wiring pattern on a flexible board. With the above, the coil antenna of the transponder 6 attached on the tread portion has an opening surface directed in the radial direction of the tire, so that the transponder 6 has dipole directivity having the maximal direction which coincides with the radial direction of the tire. Meanwhile, the coil antenna of the reader 12 mounted on the highest portion of the wheel housing 4 has an opening surface directed in the vertical direction, so that the reader 12 has dipole directivity having the maximal direction which coincides with the vertical direction. The transponder 6 is electromagnetically coupled to, and communicates with, the sensor control unit 10 when the transponder 6 is located in the vicinity of the highest portion of the wheel housing.

Figure 2:
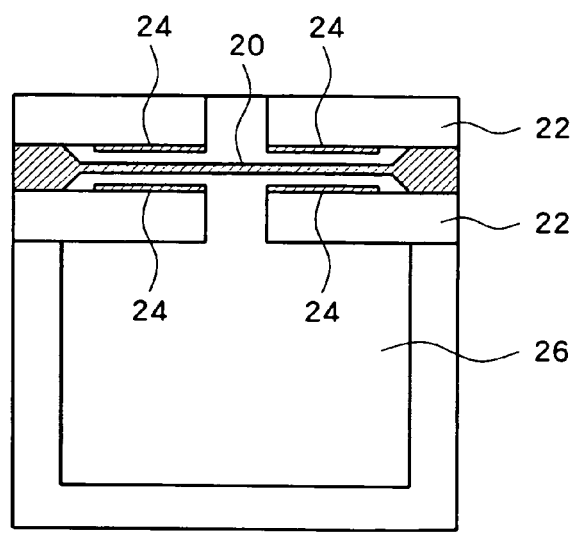
FIG. 2 is a schematic cross sectional view of a pressure sensor mounted on a transponder.

FIG. 2 is a schematic cross sectional view showing the pressure sensor mounted on the transponder 6. The shown pressure sensor is of an electrostatic capacitance type, and has a diaphragm 20 made of, e.g., a silicon semiconductor as a pressure receiving portion. Electrodes 24 formed on the boards 22, such as glass plates and so forth, are provided above and below the diaphragm 20, respectively, with some gaps therefrom so as to be opposed to each other. A sealed air chamber 26 is provided on one side of the diaphragm 20 so that the pressure of the air enclosed in the air chamber 26 acts on one side surface of the diaphragm 20 through a hole formed on the board 22. The other side of the diaphragm 20 is communicating with the space inside the tire through a hole formed on the board 22, so that the pressure of the air inside the tire acts on the other side of the diaphragm 20. As a result, the diaphragm 20 is displaced in the direction perpendicular to the surface thereof due to a difference between the pressures acting on the two sides of the diaphragm 20, causing the electrostatic capacitance between the upper and lower electrodes 24 of the diaphragm 20 to change. The change in the electrostatic capacitance is electrically read, and can be used as pressure information of the air pressure inside the tire. Notably, besides this electrostatic capacitance type pressure sensor, a pressure sensor employing a method according to which displacement of the diaphragm is determined based on a change of the strain resistance of a piezoresistive element is available.

Figure 3:
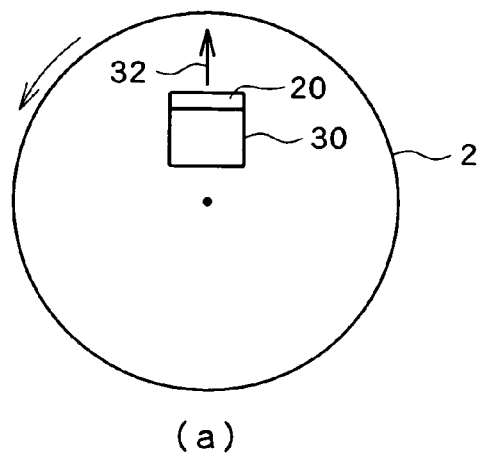
FIG. 3 is a schematic diagram explaining three typical orientations with which the pressure sensor is mounted.
Figure 3:
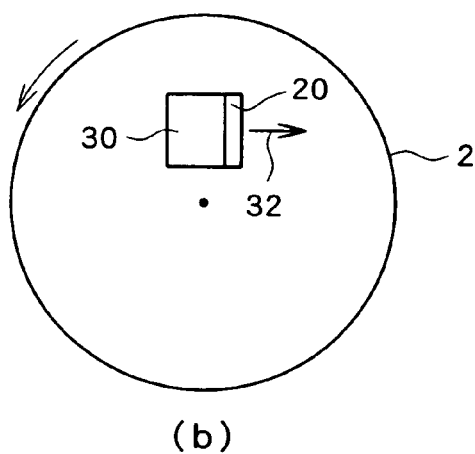
Figure 3:
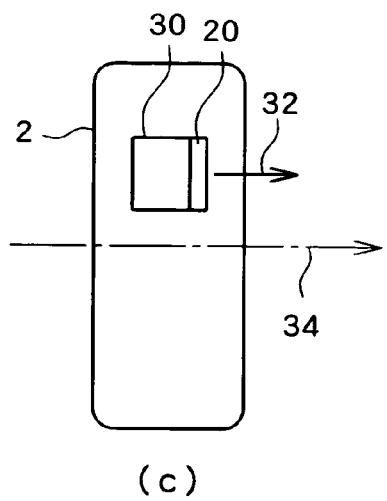

Orientation with which the pressure sensor is mounted on the tire allows some three dimensional freedom. FIG. 3 is a schematic diagram explaining three typical orientations with which the pressure sensor 30 is mounted. The orientation with which the pressure sensor 30 is mounted, shown in FIG. 3(a) is such that the direction 32 perpendicular to the diaphragm 20, or the pressure detection direction, coincides with the radial direction of the tire 20. The mounting orientation shown in FIG. 3(b) is such that the direction 32 perpendicular to the diaphragm 20 is directed towards the circumferential direction of the tire. The mounting orientation shown in FIG. 3(c) is such that the direction 32 perpendicular to the diaphragm 20 coincides with the rotational axis 34 of the tire 2. According to the TPMS in this embodiment, the pressure sensor 30 is mounted inside the tire with the orientation shown in FIG. 3(c) as, with the orientation shown in FIG. 3(a), a centrifugal force due to the rotating tire 2 acts on the diaphragm 20, which causes an error in the measurement of the air pressure inside the tire, and with the orientation shown in FIG. 3(b), an inertial force due to the rotating tire 2 acts on the diaphragm 20, which causes an error in the measurement of the air pressure inside the tire.

Figure 4:
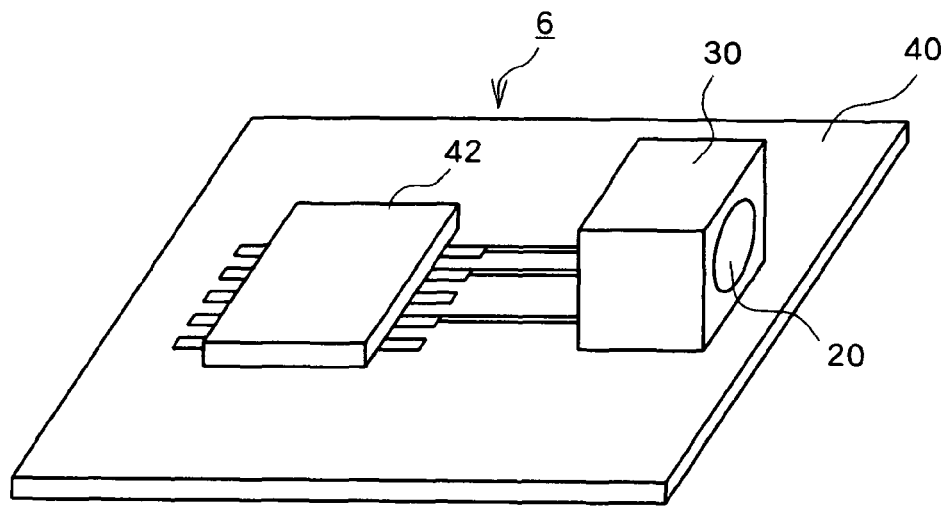
FIG. 4 is a schematic perspective view of the transponder.

FIG. 4 is a schematic perspective view of the transponder 6. The pressure sensor 30 is mounted on one surface of the board 40, constituting a response circuit which, through interaction with a supply electromagnetic field applied from the reader 12, sends data measured by the pressure sensor 30 to the reader 12. Although an IC (Integrated Circuit) 42 is shown in FIG. 4 as a part of the response circuit, a print pattern of a coil antenna which is also a part of the response circuit is formed, e.g., on the other surface of the board 40. The IC 42 is connected to the terminal (the electrode 24 and the silicon diaphragm 20) of the pressure sensor 30, in addition to the coil antenna. The IC 42 constitutes an LC resonant circuit, utilizing, e.g., the capacitance C between the terminals of the pressure sensor 30, and produces a resonant current in accordance with variation of the capacitance C. The IC 42 digitally encodes the resonant current, and modulates the supply electromagnetic field given by the reader 12 according to the digital code, to send the pressure information to the reader 12.

Here, as shown in FIG. 4, the pressure sensor 30 is mounted on the board 40 such that the displacement direction of the diaphragm 20, or the displacement portion, is set parallel to the board surface. The board 40 can be mounted inside the tire 2 on the rim portion of the wheel 8, besides the tread portion of the tire 2, such that the board surface is attached parallel to the rotational axis of the tire. These portions are suitable for mounting the board 40 in a relatively flat state, compared to other portions of the tire 2, such as a shoulder portion, a side wall portion, and so forth, of the tire, and so as to be less deformable while the vehicle is traveling. In mounting the board 40 at these positions, the transponder 6, shown in FIG. 4, can be mounted such that the direction 32 perpendicular to the diaphragm 20 of the pressure sensor 30 is set parallel to the rotational axis of the tire. Meanwhile, with the transponder 6 mounted on the board 40 such that the perpendicular direction 32 of the pressure sensor 30 is set perpendicular to the board surface, the board 40 is resultantly attached on the tread or rim portion such that the board surface is set parallel to the rotational axis of the tire, as described above. As a result, the perpendicular direction 32 is directed in the radial direction of the tire 2, as shown in FIG. 3(a), and cannot be readily directed parallel to the rotational axis of the tire.

Figure 5:
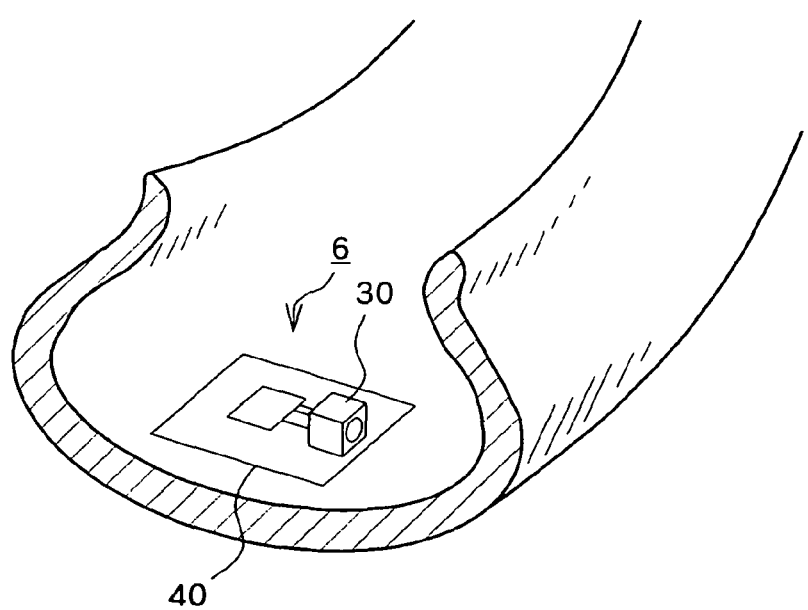
FIG. 5 is a schematic view showing a tire having the transponder mounted on the inner surface of the tread portion.
Figure 6:
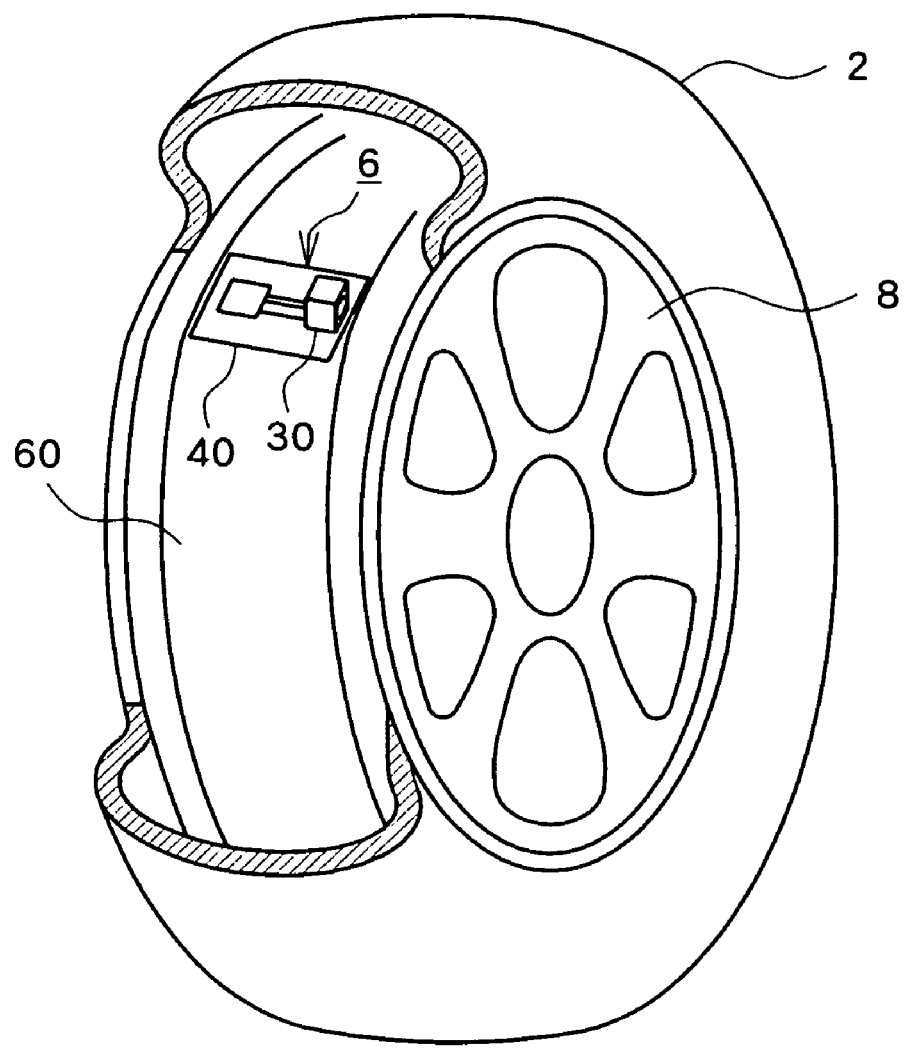
FIG. 6 is a schematic view of a rim portion of a wheel having the transponder mounted thereon.

FIG. 5 is a schematic view showing the tire 2 having the transponder 6 mounted on the inner surface of the tread portion. FIG. 6 is a schematic view showing the wheel 8 having the transponder 6 mounted on the rim portion 60. In either case, the transponder 6 is mounted such that the direction 32 perpendicular to the diaphragm 20 of the pressure sensor 30 is set parallel to the rotational axis of the tire (or wheel).

The invention claimed is:
1. A tire pressure detection system comprising:
a tire pressure detection device, mounted inside a tire of a vehicle, for detecting air pressure inside the tire; and
a reader having a coil antenna having an opening surface directed to the tire, and mounted in a highest portion of a wheel housing of the vehicle,
wherein the tire pressure detection device comprises:
a pressure sensor for measuring the air pressure, using a displacement portion to be displaced according to the air pressure; and a circuit board having a response circuit mounted on a board surface thereof, the response circuit for sending, through interaction with a supply electromagnetic field applied from the reader, data measured by the pressure sensor to the reader, wherein:

the pressure sensor is mounted on the circuit board such that a displacement direction of the displacement portion is set parallel to the board surface, the circuit board is attached on a tread portion of the tire or a rim portion of a wheel on which the tire is mounted, such that a displacement direction of the displacement portion is set parallel to a rotational axis of the tire, and the response circuit has a coil all of which is formed as a wiring pattern on the board surface, and is electromagnetically coupled with the coil antenna to transmit the measured data.

* * * * *